Feb. 14, 1967   W. J. McCONNELL ET AL   3,303,657
IRRIGATION CONDUIT INSTALLING MEANS
Filed July 29, 1965
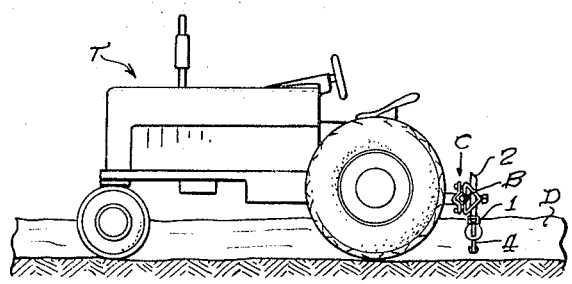
Fig. 1.
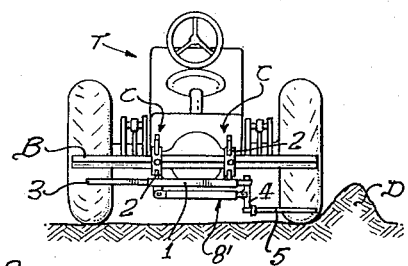
Fig. 2.
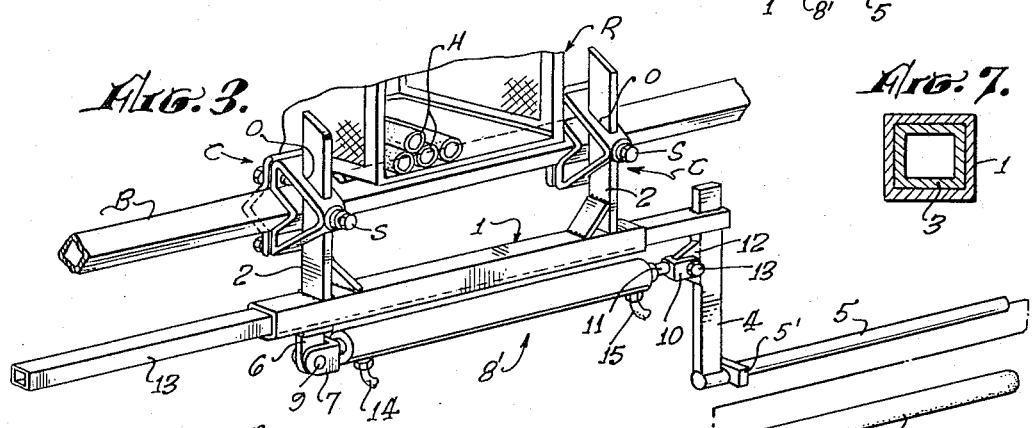
Fig. 3.
Fig. 4.
Fig. 5.
Fig. 6.
Fig. 7.
INVENTORS.
WILLIS J. McCONNELL,
WILLIS T. McCONNELL,
By Harold J. LeVisconte
ATTORNEY

United States Patent Office 3,303,657
Patented Feb. 14, 1967

3,303,657
IRRIGATION CONDUIT INSTALLING MEANS
Willis J. McConnell and Willis T. McConnell, both of
P.O. Box 21, Calipatria, Calif. 92233
Filed July 29, 1965, Ser. No. 475,791
8 Claims. (Cl. 61—72.7)

This invention relates to irrigation and more particularly to a means for installing conduits between a water supply ditch and irrigating furrows or trenches in a field surface to be irrigated.

The irrigation of fields other than by overhead sprinklers involves running water along one or more sides of a field in a ditch separated from the field itself by a low earthen dam, usually less than about one foot in height and the water is conducted from the ditch, in which the water is slightly above the surface of the field, either over the dam in siphon tubes or through the dam in tubes which are usually heavy rubber hoses approximately two feet in length with an internal diameter of slightly over 1″. In general, it is preferred to use the latter form of transporting water from the ditch to the field and heretofore the installation of each hose has involved digging a trench across the dam, placing the hose therein and then refilling the trench. Generally, it is thought of as a day's work for one man to place about 150 of these hoses which are generally spaced at intervals of a few feet apart along the dam.

The present invention is directed to a means involving the use of hydraulic force to push the hoses through the base of these low earthen dams whereby two men may install as many of these tubes in an hour as one man can install by the old trenching method in a day and accordingly, the invention has for its principal object the provision of an attachment to be mounted on the tool bar of an agricultural tractor including a hydraulic cylinder means adapted to be coupled to the hydraulic tool operating system of the tractor whereby hoses of the type described above can be forced horizontally through the dam from the ditch to the field sides thereof.

A further object of the invention is to provide a device of the above character which is readily attached to the tool bar of a tractor and which can be arranged for installing tubes in dams at either side of the tractor as may be most convenient in a given situation.

A further object of the invention is to provide a device of the above character which is simple in construction, economical to manufacture and which is reliable for its intended purpose.

With the foregoing objects in view, together with such additional objects and advantages as may subsequently appear, the invention resides in the parts and in the construction, combination and arrangement of parts described, by way of example, in the following specification of a presently preferred embodiment of the invention and in which drawings:

FIG. 1 is a side elevational view of a tractor with the device constituting the illustrated embodiment of the invention mounted thereon, FIG. 2 is a rear view of the tractor and device shown in FIG. 1, FIG. 3 is an enlarged scale, perspective view of the device with a tube or hose to be inserted through a dam by the device shown in exploded relation thereto, FIG. 4 is a side elevational view of the device with the cylinder in retracted position ready for the insertion of a hose mounted thereon through a dam shown adjacent thereto, FIG. 5 is a view similar to FIG. 4 with the device in its extended or hose inserted position, FIG. 6 is a fragmentary figure generally like the right hand side of FIGS. 4 and 5 showing the hose inserted in the dam and the inserting mandrel retracted for reception of the next hose to be inserted, and FIG. 7 is a transverse sectional view taken on the lines 7—7 of FIG. 4.

Referring first to FIGS. 1, 2 and 3, there is shown a tractor T having a horizontally transversely extending tool bar B mounted thereon at the rear thereof, said tool bar being vertically movable to desired elevations by hydraulic means not shown, such tool bars being standard equipment on agricultural tractors for the attachment to the tractor of the various types of agricultural machinery to be carried or operated thereby.

The illustrated embodiment of the invention comprises an elongated rectangular metal tube 1 provided with parallel vertical arms 2, 2 formed of rectangular steel bar and welded to one side of the tube 1 and constituting shanks adapted to be detachably secured to the tool bar B by any appropriate means such as the tool clamps C, C which surround the tool bar and are adjustable longitudinally thereof and which are provided with openings O in which the arms or shanks 2, 2 are secured by set screws S, S in a selected position of vertical adjustment and a selected position longitudinally of the tool bar. Freely slidably mounted in the tube 1 is a hollow rectangular metal tube 3 of sufficiently greater length than the tube 1 to be able to move a distance therein to be later described with maintenance of guidance by the tube 1. At one end thereof, the tube 2 carries a heavy depending arm 4 having one end thereof welded to said tube and the opposite end of the arm 4 carries a mandrel 5 projecting therefrom in a direction outwardly from but parallel to the tube 2 and preferably with an interposed hose end engaging flange 5′ disposed at the attached end thereof; said mandrel being substantially equal in length to the length of the hose to be installed thereby.

The lower face of the tube 1 at the end thereof remote from the end adjacent the depending arm 4 carries a depending lug 6 to which a yoke 7 at the end of a cylinder 8 of a double acting cylinder and piston assembly 8′ is pivotally secured by a pivot bolt or pin 9 extending horizontally and at right angles to the length of the cylinder 8. The cylinder extends generally parallel and beneath the tube 1 and the yoke 10 on the end of the piston rod 11 thereof is pivotally connected to a lug 12 on the arm 4 by a pivot pin 13 extending parallel to the pin or bolt 9. Pressure fluid lines 14 and 15 connect the opposite ends of the cylinder to a source of hydraulic pressure on the tractor through a reversing valve (not shown) whereby the piston 16 and piston rod 11 may be caused to move to right or left as viewed in FIGS. 2 through 6 as desired by operation of the said reversing valve.

In use, the tractor is moved alongside the dam or bank through which a series of tubes is to be inserted as shown in FIGS. 1 and 2. Normally this dam or bank forms the field or bed side of the ditch. Assuming that the device is retracted as shown in FIGS. 2 and 4, a hose H is placed over the mandrel 5, the tool bar with the attached hose inserting device is lowered until the hose is at the desired elevation above ground and hydraulic force is applied through line 14 causing the piston and piston rod to move the arm 4 and mandrel 5 to the right as viewed in these figures projecting the mandrel and hose through the dam D. The hydraulic force is then reversed pulling the mandrel out of the tube, the tube being held by contact with the ground of the dam, the tool bar and device raised and the tractor moved forward a few feet to the next location. Obviously this operation is best performed by two men, one on the tractor and the other walking behind and placing the tubes on the mandrel. By actual test, two men using this invention can insert as many tubes in one hour as one man can in a ten-hour day using a shovel and digging trenches transversely of the dam and inserting tubes therein and then filling the trenches. If desired, for convenience, a supply of the hoses to be inserted may be carried in a suitable rack such as shown at R in FIG. 3 or in some other appropriate and convenient location. After the tubes or hoses are thus inserted, appropriate earth moving machines are employed to complete the ditch by forming a second bank to the left of the one shown.

While in the foregoing specification there has been shown and described certain presently preferred embodiments of the invention, the invention is not to be deemed to be limited to the specific forms of the invention thus shown by way of example and it will be understood that the invention includes as well all such changes and modifications in the parts and in the construction, combination and arrangement of parts as shall come within the purview of the appended claims.

We claim:

1. Apparatus for installing water transmitting conduit elements through an earthen embankment forming a side of an irrigation ditch, said apparatus comprising a horizontally extending mandrel carried by an actuating means operable to move said mandrel parallel to the axial line of said mandrel, said mandrel affording support for a conduit element telescopically mounted thereon, a mobile means on which said mandrel actuating means is mounted, said mobile means being operable to carry said mandrel actuating means and said mandrel in a path adjacent and parallel to the embankment in which the conduit is to be installed with said mandrel disposed transversely to said path, power means including manually controlled devices on said mobile means operable to move said mandrel actuating means bodily vertically and other manually controlled devices on said mobile means operable both to cause said mandrel and a conduit element mounted thereon to move endwise into an embankment and, thereafter, to move said mandrel in the opposite direction to withdraw it from the conduit element and the embankment leaving the conduit element installed therein.

2. Apparatus as claimed in claim 1 in which said mobile means constitutes an agricultural tractor provided with a hydraulic system including a hydraulically vertically movable, horizontally transversely extending tool bar, in which said actuating means for said mandrel is detachably mountable upon said tool bar for movement therewith, and in which said portion of said power means which is operable to move said mandrel endwise is connected to the tractor hydraulic system for actuation thereby.

3. An accessory apparatus for use with an agricultural tractor having a tool bar and clamp devices for detachable connection to the tractor of tools and devices to be operated by the tractor, said apparatus comprising an elongated base member provided with mounting means engageable by the tool bar clamp devices, an elongated mandrel carrying member slidably mounted on said base member for reciprocable movement parallel to the length of said base member, a horizontally extending mandrel carried by and projecting with a free terminal end beyond one end of said mandrel carrying member and disposed in parallel relation to the path of said reciprocable movement; said mandrel having shoulder means inwardly from said terminal end but outwardly beyond said mandrel carrying member for bearing engagement with a tubular conduit telescopically and removably mounted on the mandrel, and manually controlled, reversible power means connected to and interposed between said base member and said mandrel carrying member operable to effect said reciprocable movement and in one direction of said movement to project said mandrel and the conduit telescopically mounted thereon into an earthen embankment forming a side of an irrigation ditch and in the opposite direction of said movement to withdraw said mandrel from the inserted conduit element leaving the conduit element installed in the embankment.

4. An accessory apparatus as claimed in claim 3 in which said base member comprises a length of hollow, rectangular metal bar and in which said mandrel carrying member includes a rectangular metal bar slidably mounted in and guided by said base member.

5. An accessory apparatus as claimed in claim 3 in which said mounting means includes a pair of spaced, parallel, vertical shanks rigidly mounted on said base member and engageable with the clamp devices on a tool bar of a tractor for mounting said apparatus on the tractor.

6. An accessory apparatus as claimed in claim 3 in which said power means includes a double acting hydraulic cylinder and piston assembly having the components thereof connected to and reacting between said base member and said mandrel carrying member.

7. An accessory apparatus as claimed in claim 3 in which said mandrel is laterally offset from said mandrel carrying member.

8. An accessory apparatus as claimed in claim 7 in which said mandrel carrying member includes a laterally extending arm portion at one end thereof, and in which said mandrel is mounted on the end of said arm remote from said mandrel carrying member.

References Cited by the Examiner

UNITED STATES PATENTS

| | | | |
|---|---|---|---|
| 178,957 | 6/1876 | Reynolds | 61—72.5 |
| 868,565 | 10/1907 | Huffmaster | 61—72.7 X |
| 1,872,523 | 8/1932 | Sweeney et al. | 61—72.7 X |
| 2,517,494 | 8/1950 | Kiss et al. | |
| 2,656,683 | 10/1953 | Riva | 61—72.7 |
| 2,823,898 | 2/1958 | Bankston | 61—72.7 X |
| 2,830,548 | 4/1958 | McElvany | 61—72.1 |
| 3,023,586 | 3/1962 | Morrison | 61—72.1 |
| 3,107,741 | 10/1963 | Adams et al. | 61—72.7 X |
| 3,132,701 | 5/1964 | Juntunen | 61—72.7 X |
| 3,204,417 | 9/1965 | Robley | 61—72.3 |

References Cited by the Applicant

UNITED STATES PATENTS

| | | |
|---|---|---|
| 2,743,687 | 5/1956 | Hopkins. |
| 2,902,832 | 9/1959 | Levy et al. |

EARL J. WITMER, *Primary Examiner.*